(12) United States Patent
Park et al.

(10) Patent No.: US 9,496,056 B2
(45) Date of Patent: Nov. 15, 2016

(54) COMBINATION OF TOP NOZZLE AND GUIDE THIMBLE FOR NUCLEAR FUEL ASSEMBLY

(75) Inventors: Nam-Gyu Park, Daejeon (KR); Kyu-Tae Kim, Daejeon (KR); Jung-Min Suh, Daejeon (KR); Shin-Ho Lee, Daejeon (KR); Kyong-Bo Eom, Daejeon (KR); Joon-Kyoo Park, Daejeon (KR); Jin-Sun Kim, Daejeon (KR); Gyu-Choel Shin, Daejeon (KR); Seong-Ki Lee, Daejeon (KR); Il-Kyu Kim, Daejeon (KR); Ki-Sung Choi, Daejeon (KR); Kyeong-Lak Jeon, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 1274 days.

(21) Appl. No.: 13/585,416

(22) Filed: Aug. 14, 2012

(65) Prior Publication Data

US 2016/0300629 A1    Oct. 13, 2016

Related U.S. Application Data

(63) Continuation-in-part of application No. 12/187,455, filed on Aug. 7, 2008, now abandoned.

(30) Foreign Application Priority Data

Aug. 27, 2007    (KR) .......................... 10-2007-0086066

(51) Int. Cl.
G21C 3/33    (2006.01)

(52) U.S. Cl.
CPC ............... *G21C 3/3315* (2013.01); *G21C 3/33* (2013.01)

(58) Field of Classification Search
CPC ...... G21C 3/30; G21C 3/3206; G21C 3/322; G21C 3/33; G21C 3/3305; G21C 3/331; G21C 3/3315
USPC ....................................................... 376/446
See application file for complete search history.

(56) References Cited

U.S. PATENT DOCUMENTS 4,687,630 A    8/1987    Gjertsen et al.
4,702,883 A    10/1987    Wilson et al.

*Primary Examiner* — Marshall O'Connor
(74) *Attorney, Agent, or Firm* — Rabin & Berdo, P.C.

(57) ABSTRACT

A joint structure between a top nozzle and a guide thimble of a nuclear fuel assembly and, more particularly, a structure for joining an inner-extension tube, the top nozzle and the guide thimble. When an inner-extension tube head, which is provided as a means for facilitating removal of the top nozzle of the nuclear fuel assembly from the guide thimble, is removed from an inner-extension tube body to separate the top nozzle from the nuclear fuel assembly, the inner-extension tube body is prevented from undesirably rotating, so that the guide thimble and the inner-extension tube body can maintain the joined state.

2 Claims, 16 Drawing Sheets

COMBINATION OF TOP NOZZLE AND GUIDE THIMBLE FOR NUCLEAR FUEL ASSEMBLY

CROSS-REFERENCE TO RELATED APPLICATIONS

This is a Continuation-in-part Application of U.S. application Ser. No. 12/187,455, filed on Aug. 7, 2008, which claims the benefit of priority from Korean Patent Application No. 10-2007-0086066, filed on Aug. 27, 2007, the disclosures of both of which are expressly incorporated by reference herein in their entireties.

BACKGROUND OF THE INVENTION

1. Field of the Invention

The present invention relates generally to joint structures between top nozzles and guide thimbles of nuclear fuel assemblies and, more particularly, to a joint structure between a top nozzle and a guide thimble which is configured such that an inner-extension tube is prevented from undesirably rotating when the top nozzle is separated from the nuclear fuel assembly.

2. Description of the Related Art

A nuclear reactor refers to a device that is designed to exert artificial control over the chain reaction of the nuclear fission of fissile materials, thereby achieving a variety of purposes such as the generation of heat, the production of radioisotopes and plutonium, the formation of radiation fields, or the like.

Generally, enriched uranium that is obtained by raising the ratio of uranium-235 to a range between 2% and 5% is used in a light water nuclear reactor. The uranium is molded into a cylindrical pellet that weighs 5 g and processed into nuclear fuel that is used in a nuclear reactor. Numerous pellets are embedded into a cladding tube made of Zircaloy which is in a vacuum state. Thereafter, a spring and helium gas are put into the tube, and then a top end closure stopper is welded thereon, thereby making a fuel rod. A plurality of fuel rods constitutes a nuclear fuel assembly and is burned in a nuclear reactor by nuclear reaction.

FIG. 1 is a schematic view showing a general nuclear fuel assembly.

Referring to FIG. 1, the nuclear fuel assembly includes a skeleton and a plurality of fuel rods 1. The skeleton includes a top nozzle 4, a bottom nozzle 5, a plurality of spacer grids 2, a plurality of guide thimbles 3 and a instrument tube 6. The fuel rods 1 are inserted longitudinally into an organized array by the spacer grids 2 in such a manner as to be supported by means of springs (not shown) and dimples (not shown) which are formed in the spacer grids 2. In order to prevent the formation of scratches on the fuel rods 1 and damage to the springs upon assembling the nuclear fuel assembly, lacquer is applied to the surfaces of the fuel rods 1 before the fuel rods 1 are inserted longitudinally into the skeleton of the nuclear fuel assembly. Subsequently, the top and bottom nozzles are secured to the opposite ends of the nuclear fuel assembly, thereby finishing the procedure of assembly of the nuclear fuel assembly. After the lacquer is removed, the following items of the assembled nuclear fuel assembly are tested: the distance between the fuel rods, distortion, dimensions including the length, etc., thus completing the process of manufacturing the nuclear fuel assembly.

As shown in FIG. 2, the top nozzle 4 includes a hold-down plate 42, hold-down springs 43, inner-extension tubes 45, outer guide posts 44, and a flow plate 41.

Referring to FIGS. 1 and 2, the inner-extension tubes 45 of the top nozzle 4 are connected to the respective guide thimbles 3 so that the nuclear fuel assembly can be firmly fixed in the reactor and the structural stability of the nuclear fuel can be ensured during the burn-up of the nuclear fuel.

The top nozzle 4 and the guide thimbles 3 are joined to each other in such a way as to be removably connected to each other, thereby ensuring a path along which the fuel rods 1 can be drawn out when disassembling the top nozzle 4. Disassembly of the top nozzle 4 from the guide thimbles 3 is carried out in a storage tank. A worker must remotely perform the disassembly work to minimize the harm caused by radiation. Accordingly, the joint structure between the top nozzle 4 and the guide thimbles 3 must be designed such that assembly or disassembly between them can be conducted remotely.

FIGS. 2 and 3 illustrate a typical method of connecting the guide thimbles 3 with the top nozzle 4. Referring to the drawings, the method of joining the guide thimbles 3 and the top nozzle 4 will be described. As shown in FIG. 2, an external thread is formed on a lower end 451 of each inner-extension tube 45. As shown in FIG. 3, an internal thread is formed on an inner surface of a threaded portion 31 of each guide thimble 3. The top nozzle 4 and the guide thimbles 3 are joined with each other by thread-coupling. An external thread is formed on a lower end of each outer guide post 44. The outer guide posts 44 are threadedly coupled to the flow plate 41. The threaded lower end of each outer guide post 44 is partially welded to the flow plate 41 to prevent the outer guide post 44 from rotating. Furthermore, in order to prevent each inner-extension tube 45 from becoming loose, a head of the inner-extension tube 45 is partially crimped in a radial direction in such a way as to be put in contact with the outer guide post 44. Moreover, the inner-extension tube 45 can be separated from the outer guide post 44 only when torque of more than a specific strength is applied to the head.

However, in the state where the inner-extension tube 45 is joined with the outer guide post 44, when the inner-extension tube 45 of the top nozzle 4 is rotated to be separated from the outer guide post 44, since the distance between an outer surface of the inner-extension tube 45 and an inner surface of the outer guide post 44 is too short, it is difficult to rotate the inner-extension tube 45 along the threads if concentricity is not congruous or if foreign substances have gotten stuck between the outer face and the inner face. That is, due to frictional heat generated by the contact surface, the inner-extension tubes 45 and the outer guide posts 44, which are made of stainless steel, are fused together by a cold welding effect, and hence, loosening does not occur.

To solve the above-mentioned problems, there have been disclosed U.S. Pat. No. 4,702,883 entitled "Reconstitutable fuel assembly having removable upper stops on guide thimbles", and U.S. Pat. No. 4,687,630 entitled "Top nozzle and guide thimble joint structure in a nuclear fuel assembly".

In the prior arts, heads of outer guide posts are removed without any inner-extension tube, and processed to have threads so as to minimize the contact surface when the outer guide posts are removed.

Furthermore, each guide thimble is threadedly coupled to a threaded portion of a lower end of the corresponding outer guide post. Thus, two threaded coupling portions are respectively formed on upper and lower ends of each outer guide post.

Accordingly, when the head of each outer guide post is rotated to remove the top nozzle, since the outer guide post and the head thereof are threadedly-coupled with each other, the thread-coupling between the outer guide post and the guide thimble may become loosened.

Hence, in order to prevent the lower end of the outer guide post from becoming loosened, the outer guide post is equipped with a wedge device; however, this has the problem of the assembling and disassembling processes being complicated.

SUMMARY OF THE INVENTION

Accordingly, the present invention has been made keeping in mind the above problems occurring in the prior art, and an object of the present invention is to provide a joint structure between a top nozzle and a guide thimble which is configured such that when an inner-extension tube head that has been threadedly coupled to an inner-extension tube body is removed from the inner-extension tube body to disassemble the top nozzle, the inner-extension tube body can be prevented from being undesirably removed from the guide thimble.

In order to accomplish the above object, the present invention provides a joint structure between a guide thimble and a top nozzle of a nuclear fuel assembly, the guide thimble being coupled to a spacer grid of the nuclear fuel assembly, the top nozzle including: a flow plate located above the guide thimbles, with a coupling through hole formed through the flow plate; an outer guide post coupled at a lower end thereof to the coupling through hole of the flow plate; an inner-extension tube disposed in the outer guide post in such a way that a lower end of the inner-extension tube passes through the coupling through hole of the flow plate; and an inner-extension tube head coupled both to an upper end of the inner-extension tube and to an upper end of the outer guide post, the inner-extension tube head connecting the inner-extension tube and the outer guide post to each other, wherein rotation-preventing means is provided in at least one of a junction between the inner-extension tube and the coupling through hole of the flow plate and a junction among the inner-extension tube head, the inner-extension tube body and the outer guide post, the rotation-preventing means preventing the inner-extension tube body from rotating when the inner-extension tube head is rotated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is provided to achieve the above-mentioned object.

The present invention is characterized by the constructions of an outer guide post 120, an inner-extension tube 150, a flow plate 160 and a guide thimble 3.

(Therefore, a hold-down plate and a hold-down spring which are elements of a top nozzle but are not directly related to the present invention will not be explained herein.)

Figure 4:
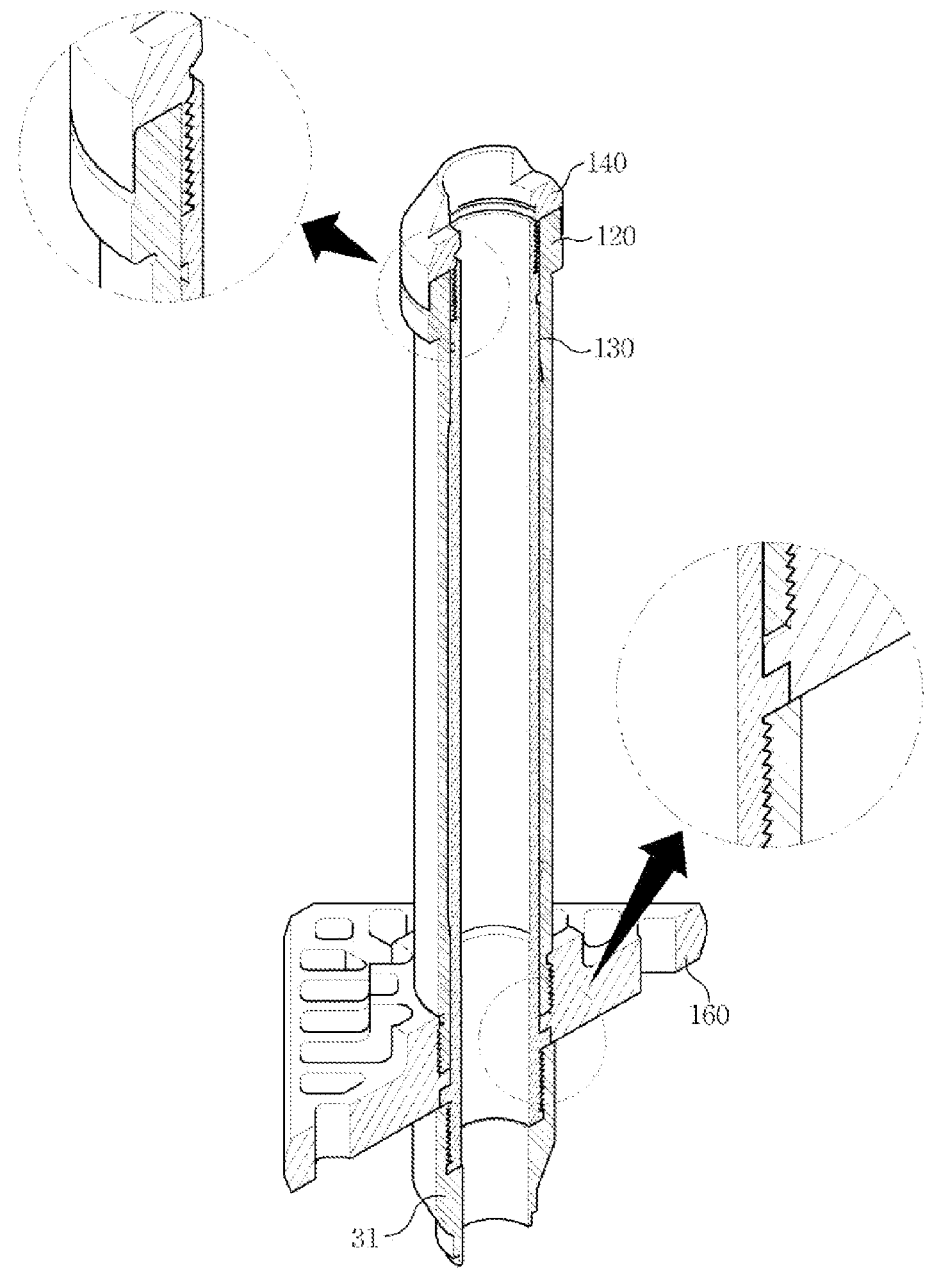
FIG. 4 is a perspective sectional view showing the joining of a top nozzle to a guide thimble according to the present invention.

Hereinafter, a joint structure among the above elements will be described in detail. FIG. 4 illustrates the joint structure.

Figure 5:
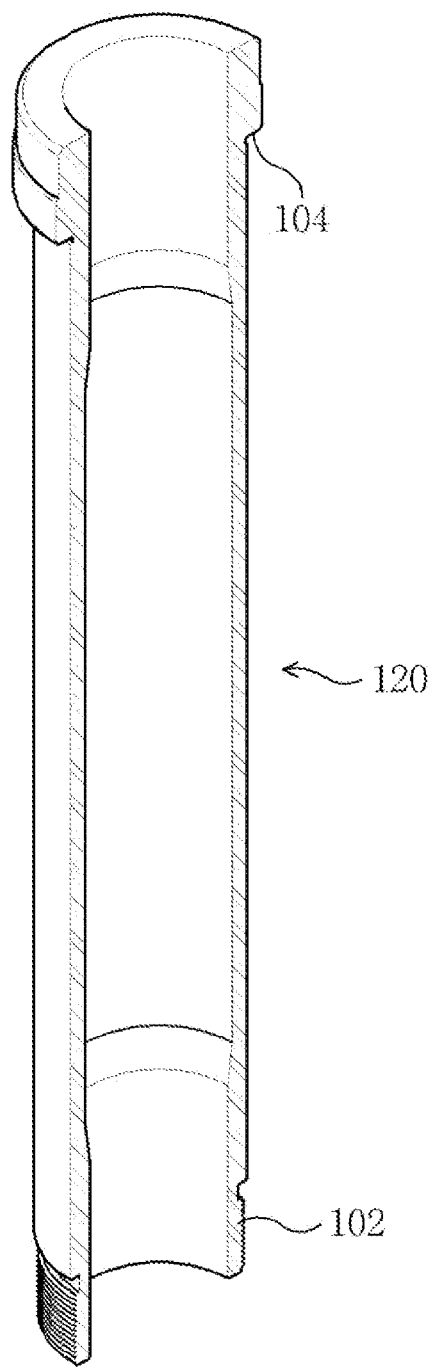
FIG. 5 is a perspective sectional view of an outer guide post according to the present invention.

Referring to FIG. 5, the shape of the outer guide post 120 is that of a hollow cylinder that has open upper and lower ends. An external thread 102 is formed on a predetermined portion of an outer surface of a lower end of the outer guide post 120 and is used to couple the outer guide post 120 to the flow plate 160.

The diameter of a predetermined portion of an upper end of the outer guide post 120 larger than those of other portions of the outer guide post 120. Thus, an annular retaining part 104 is formed by this difference in diameter so that the outer guide post 120 can be joined with a hold-down plate (not shown) by means of the annular retaining part 104.

Figure 6:
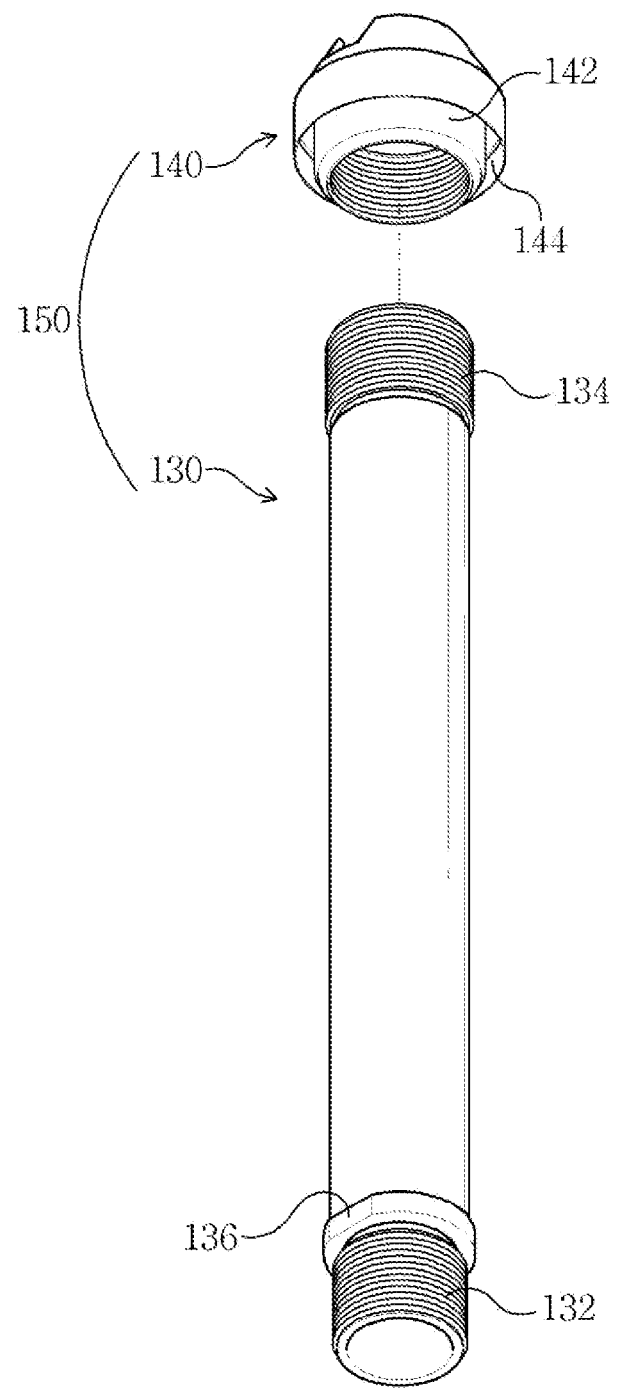
FIG. 6 is a perspective view of an inner-extension tube according to the present invention.

As shown in FIG. 6, the inner-extension tube 150 includes an inner-extension tube body 130 and an inner-extension tube head 140.

The shape of the inner-extension tube body 130 is that of a hollow cylinder that has open upper and lower ends in the same manner as that of the outer guide post 120. Furthermore, the inner-extension tube body 130 is longer than the outer guide post 120 and is disposed in the outer guide post 120 in such a way that an upper end of the inner-extension tube body 130 is level with that of the outer guide post 120 while its lower end protrudes outwards from that of the outer guide post 120.

An external thread 132 is formed on a predetermined portion of the lower end of the inner-extension tube body 130, in other words, on the portion of the inner-extension tube body 130 that protrudes outwards from the outer guide post 120. The external thread 132 is used to couple the inner-extension tube body 130 to the guide thimble 3 which will be explained in detail later herein.

The inner-extension tube head 140 is coupled to the upper end of the inner-extension tube body 130. The shape of the inner-extension tube head 140 is that of a cork stopper of which upper and lower ends are the same in shape but are different in diameter. Further, the inner-extension tube head 140 has a hollow structure which is open on upper and lower ends thereof. An internal thread 142 is formed on a predetermined portion of an inner surface of the lower end of the inner-extension tube head 140 so that it is threaded over a circumferential outer surface of an upper end 134 of the inner-extension tube body 130.

Here, an annular retaining part 144 is formed by a difference in diameter between the upper and lower ends of the inner-extension tube head 140. The maximum diameter of the annular retaining part 144 is equal to or larger than the diameter of the upper end of the outer guide post 120 so that the inner-extension tube head 140 can be placed on the upper end of the outer guide post 120 rather than being inserted thereinto. Furthermore, the inner-extension tube head 140 has a thin film structure such that it is crimped into a depression of the outer guide post 120, thus preventing the inner-extension tube head 140 from becoming loose.

A rotation-preventing surface 136 is formed on the lower portion of the inner-extension tube body 130.

The rotation-preventing surface 136 is disposed above the external thread 132 that is formed on the lower end of the inner-extension tube body 130. The rotation-preventing surface 136 is a planar surface formed by cutting out a portion of an annular flange provided above the external thread 132. The rotation-preventing surface 136 functions to prevent the inner-extension tube body 130 from rotating when the inner-extension tube head 140 is separated from the inner-extension tube body 130.

Figure 7:
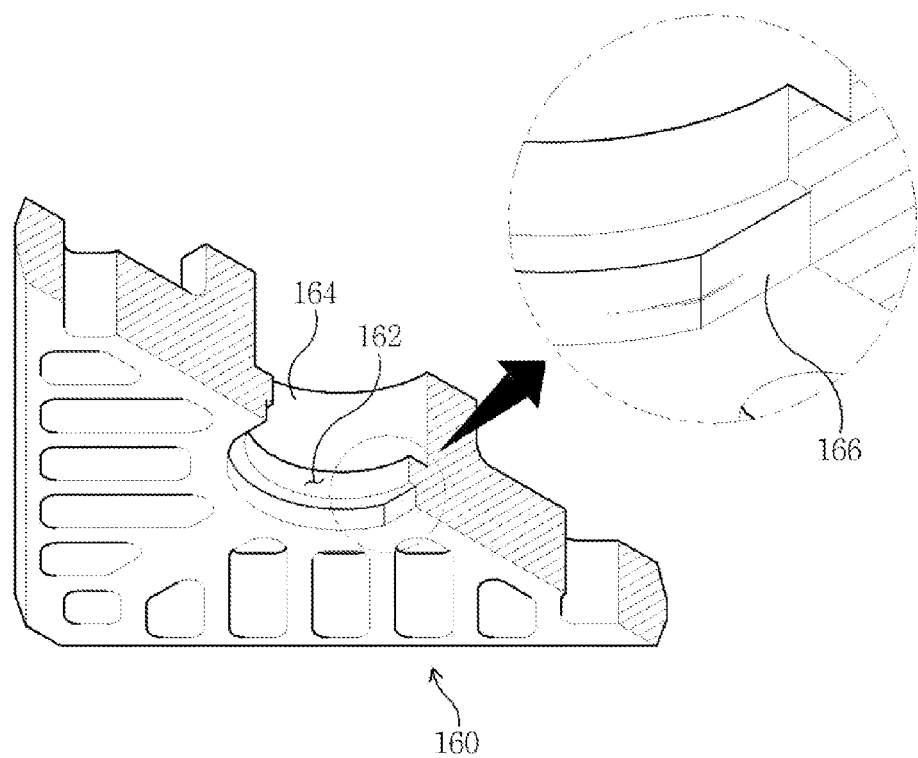
FIG. 7 is a perspective sectional view of a flow plate according to the present invention.

As shown in FIG. 7, a coupling through hole 162 is formed at a predetermined position in the flow plate 160 so that the outer guide post 120 is coupled to the inner-extension tube 150 via the screw coupling the upper peripheral surface on the hole 162.

An female screw is formed on a circumferential inner surface of the coupling through hole 162. The diameter of the annular retaining part is the same as the outer diameter of the outer guide post 120. A lower surface of the annular retaining part is put into close contact with an upper surface of the annular flange provided on the inner-extension tube body 130.

The diameter of an upper end of the coupling through hole 162 is the same as the outer diameter of the outer guide post 120. An internal thread is formed on a circumferential inner surface of the upper end of the coupling through hole 162 so that the lower end of the outer guide post 120 is threaded into the coupling through hole 162.

A rotation-preventing portion 166 is formed on a lower end of the inner surface of the coupling through hole 162. The rotation-preventing portion 166 is disposed at a position corresponding to the rotation-preventing surface 136 of the inner-extension tube body 130 and has a polygonal shape corresponding to the shape of the rotation-preventing surface 136.

Figure 1:
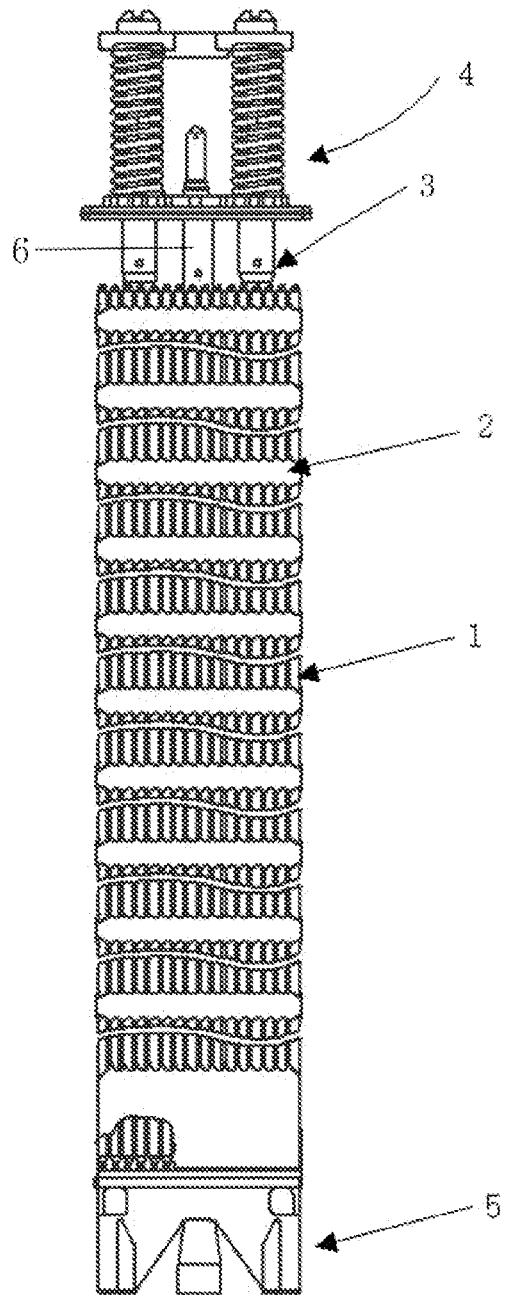
FIG. 1 is a schematic view of a conventional nuclear fuel assembly.
Figure 2:
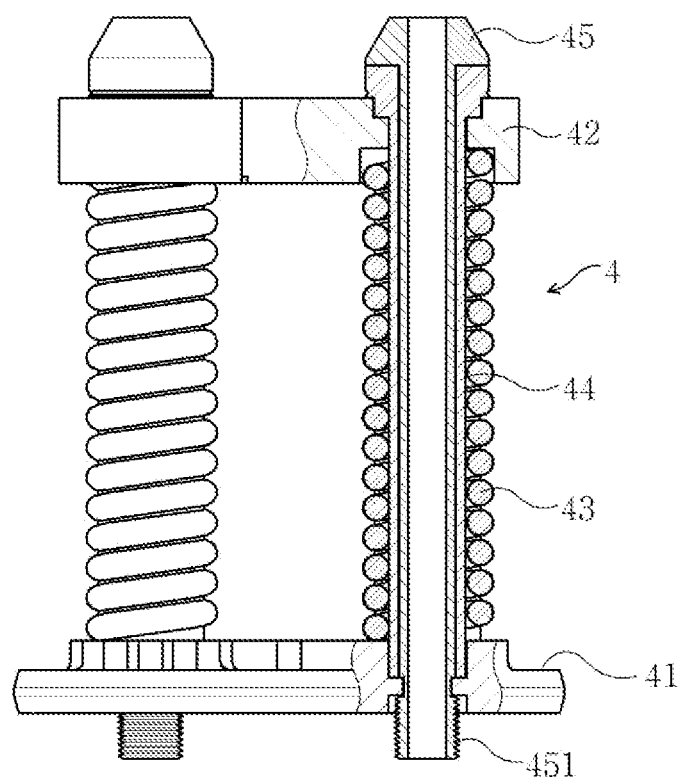
FIG. 2 is a partial sectional view of a conventional top nozzle.
Figure 3:
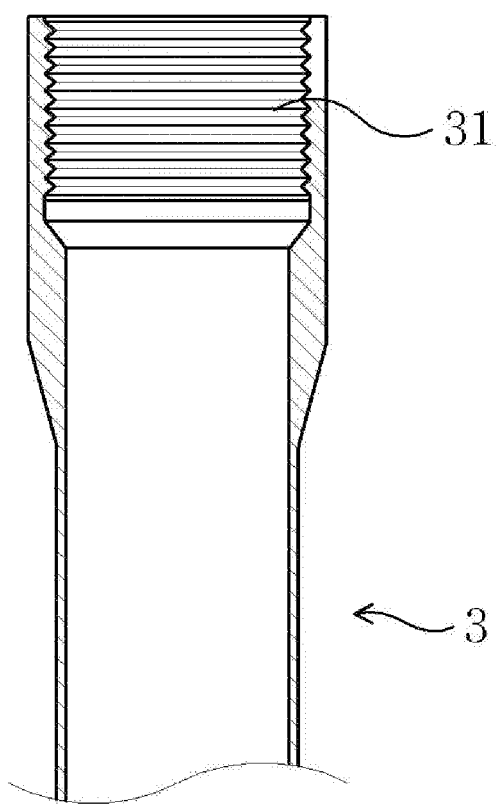
FIG. 3 is a sectional view of a conventional guide thimble.

A threaded portion 31 is provided on an upper end of the guide thimble 3 (refer to FIG. 3). The shape of the threaded portion 31 of the guide thimble 3 is that of a hollow cylinder that has an open upper end. The diameter of the threaded portion 31 is the same as that of the inner-extension tube 150. An internal thread is formed on the inner surface of the threaded portion 31.

The lower end of the inner-extension tube body 130 is threadedly coupled to the threaded portion 31 of the guide thimble 3.

A process of disassembling the top nozzle from the guide thimble will be explained with reference to FIG. 6.

First, the inner-extension tube heads 140 are rotated with respect to the corresponding inner-extension tube bodies 130 and removed therefrom. Thereafter, the top nozzle that includes the outer guide posts 120, the flow plate 160, hold-down springs (not shown) and the hold-down plate (not shown) is separated from the nuclear fuel assembly.

When each inner-extension tube head 140 is separated from the corresponding inner-extension tube body 130, the thread-coupling between the inner-extension tube body 130 and the threaded portion 31 of the corresponding guide thimble 3 may become loose. However, by virtue of the rotation-preventing surface 136 formed on the inner-extension tube body 130 and the rotation-preventing portion 166 provided on the flow plate 160, the undesirable separation of the inner-extension tube body 130 from the threaded portion 31 of the guide thimble 3 can be prevented.

Figure 8:
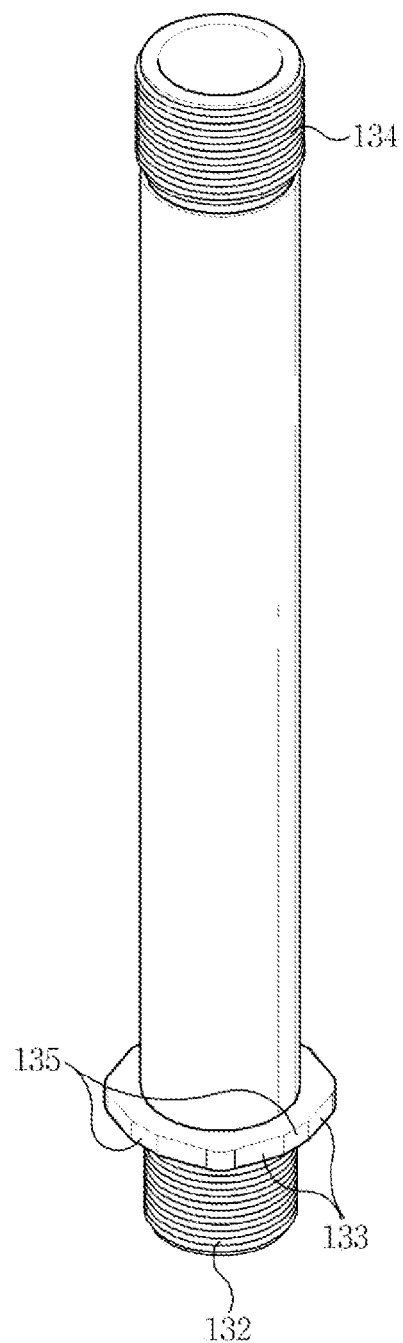
FIG. 8 is a perspective view showing an inner-extension tube according to a first embodiment of the present invention.
Figure 9:
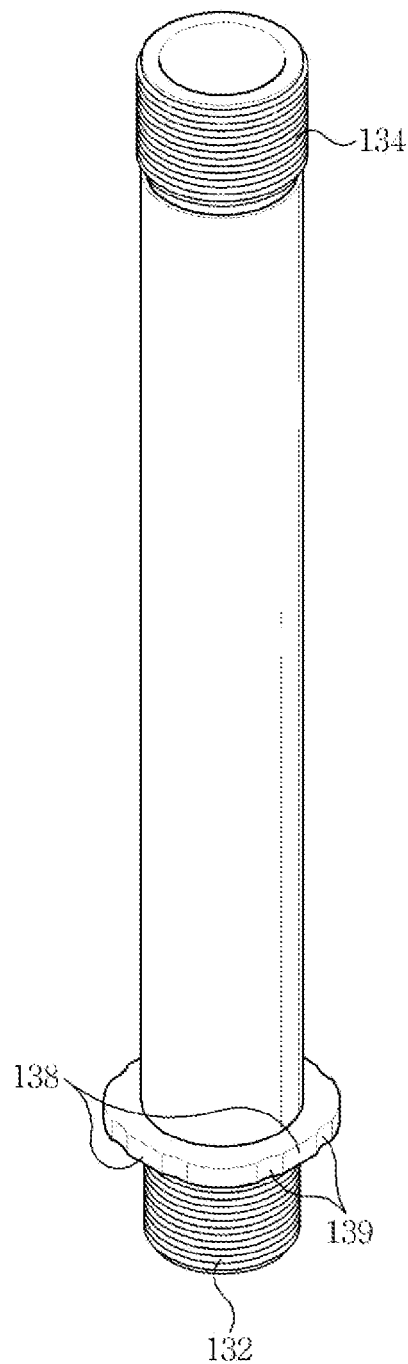
FIG. 9 is a perspective view showing an inner-extension tube according to a second embodiment of the present invention.

FIGS. 8 through 10 illustrate first and second embodiments of the rotation-preventing surface of the inner-extension tube body and the rotation-preventing portion of the flow plate.

Unlike the inner-extension tube body 130 described above, several planar surfaces may be formed on the annular flange of the inner-extension tube body 130 to provide a plurality of rotation-preventing surfaces 135.

In detail, as shown in FIG. 8, the rotation-preventing surfaces 135 are formed on the annular flange at positions spaced apart from each other at angular intervals of 90°. Planar cut portions 133 are formed on opposite sides of each rotation-preventing surface 135.

The planar cut portions 133 formed between the rotation-preventing surfaces 135 function to prevent interference between fuel rods and the annular flange of the inner-extension tube body when the fuel rods, which are disposed adjacent to the guide thimble in spacer grids of the nuclear fuel assembly, are inserted longitudinally into or drawn out from the nuclear fuel assembly.

The second embodiment of the inner-extension tube body 130 is illustrated in FIG. 9.

As shown in FIG. 9, rotation-preventing surfaces 138 are formed on an annular flange of the inner-extension tube body 130 at positions spaced apart from each other at angular intervals of 90°. Recesses 139 are formed in the annular flange on opposite sides of each rotation-preventing surface 138 at positions spaced apart from each other by a predetermined distance. The recesses 139 conduct the same role as that of the planar cut portion 133 described in the first embodiment.

Figure 10A:
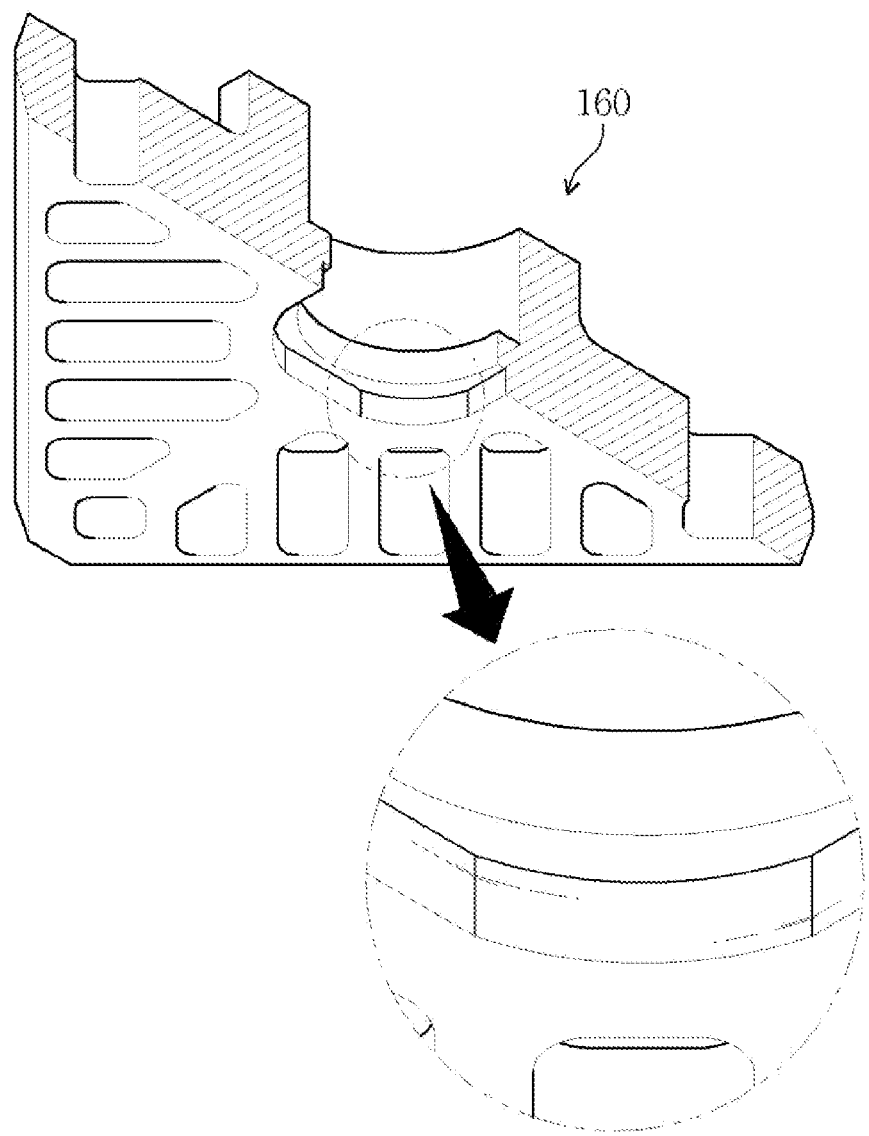
FIG. 10A is a perspective sectional view showing an embodiment of the flow plate according to the present invention.
Figure 10B:
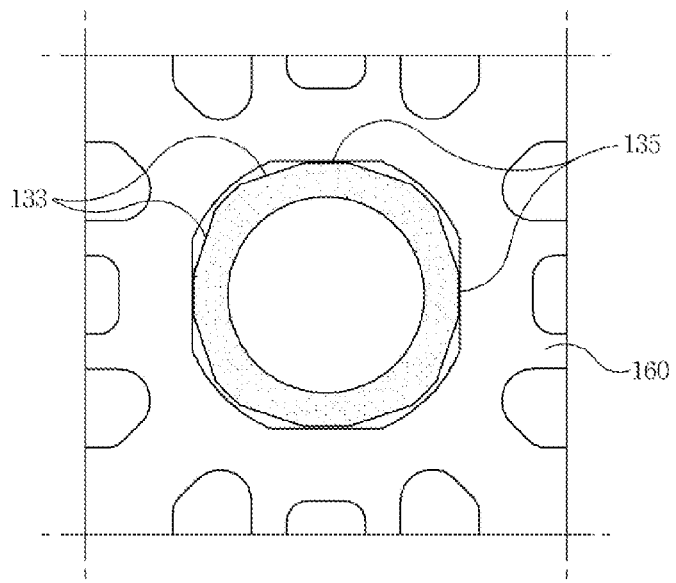
FIG. 10B is a bottom view showing a joint structure between the flow plate and the inner-extension tube of the first embodiment of the present invention.

The flow plate 160 which is coupled to the inner-extension tube body 130 of the first or second embodiment may be used in such a way that flow plates that correspond to the respective flanges of the inner-extension tube bodies of the first and second embodiments are separately provided. However, as shown in FIG. 10A, the lower end of the coupling through hole of the flow plate 160 preferably has a shape corresponding to the annular flange of the inner-extension tube body 130 that is provided only with the rotation-preventing surfaces 135 without any planar cut portion 133. In this case, as shown in FIG. 10B, when the inner-extension tube body 130 is coupled to the flow plate 160, the rotation-preventing surfaces 135 are put into close contact with the flow plate 160, but portions of the annular flange other than the rotation-preventing surfaces 135 are spaced apart from the flow plate 160 rather than making contact with it.

Figure 10C:
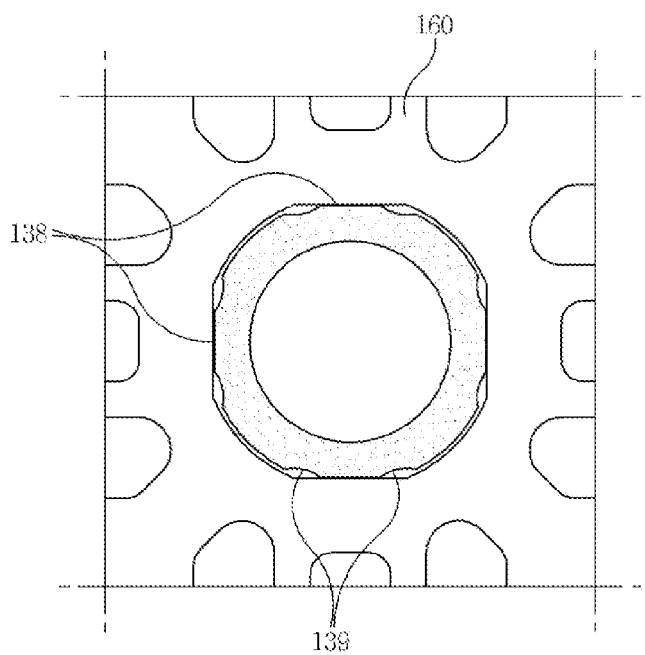
FIG. 10C is a bottom view showing a joint structure between the flow plate and the inner-extension tube of the second embodiment of the present invention.

Furthermore, the flow plate 160 that has the shape of FIG. 10A can be coupled not only to the inner-extension tube body of the first embodiment but also to that of the second embodiment. As shown in FIG. 10C, the general shape of the annular flange of the inner-extension tube body of the second embodiment is the same as that of the annular flange of the inner-extension tube body of the first embodiment, except for a difference in shape between the planar cut portions 133 and the recesses 139. Therefore, the flow plate of FIG. 10A can be used for the inner-extension tube body of the second embodiment.

Figure 11:
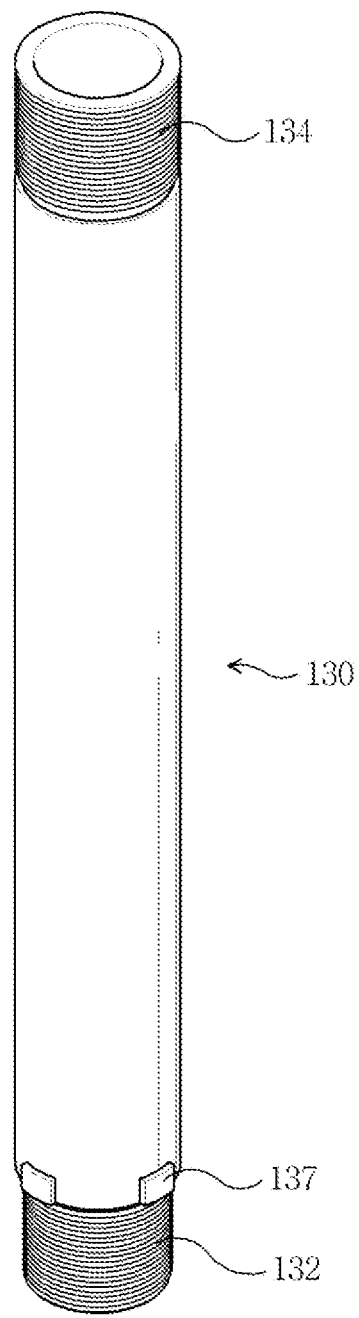
FIG. 11 is a perspective view showing an inner-extension tube body according to a third embodiment of the present invention.
Figure 12:
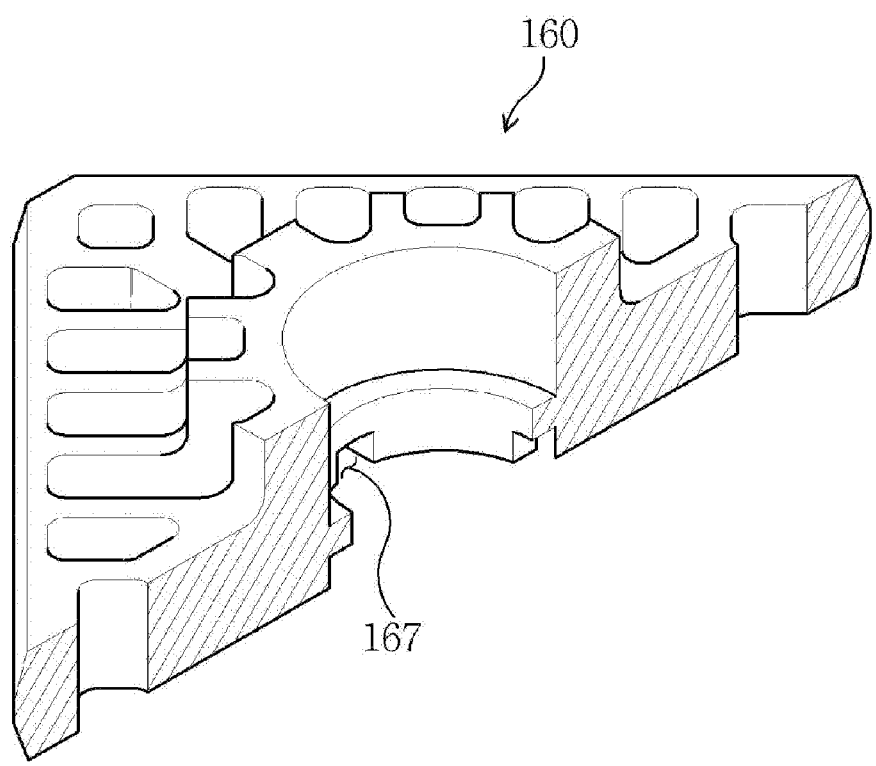
FIG. 12 is a perspective sectional view of a flow plate according to the third embodiment of the present invention.

FIGS. 11 and 12 illustrate a third embodiment with regard to the rotation-preventing surface of the inner-extension tube body and the rotation-preventing portion of the flow plate.

In this embodiment, a plurality of rotation-preventing protrusions 137 are provided on the inner-extension tube body 130 and arranged in the circumferential direction at the same positions as those of the rotation-preventing surfaces 136 of the inner-extension tube body 130 described above.

Rotation-preventing recesses 167 that have shapes corresponding to the rotation-preventing protrusions 137 are formed in the flow plate 160 at the same positions as those of the rotation-preventing portions 166 of the flow plate 160 described above.

The joint structure between the inner-extension tube body and the inner-extension tube head of the inner-extension tube or between the inner-extension tube body and the outer guide post may be embodied by force-fitting rather than thread-coupling (in a fourth embodiment).

Figure 13:
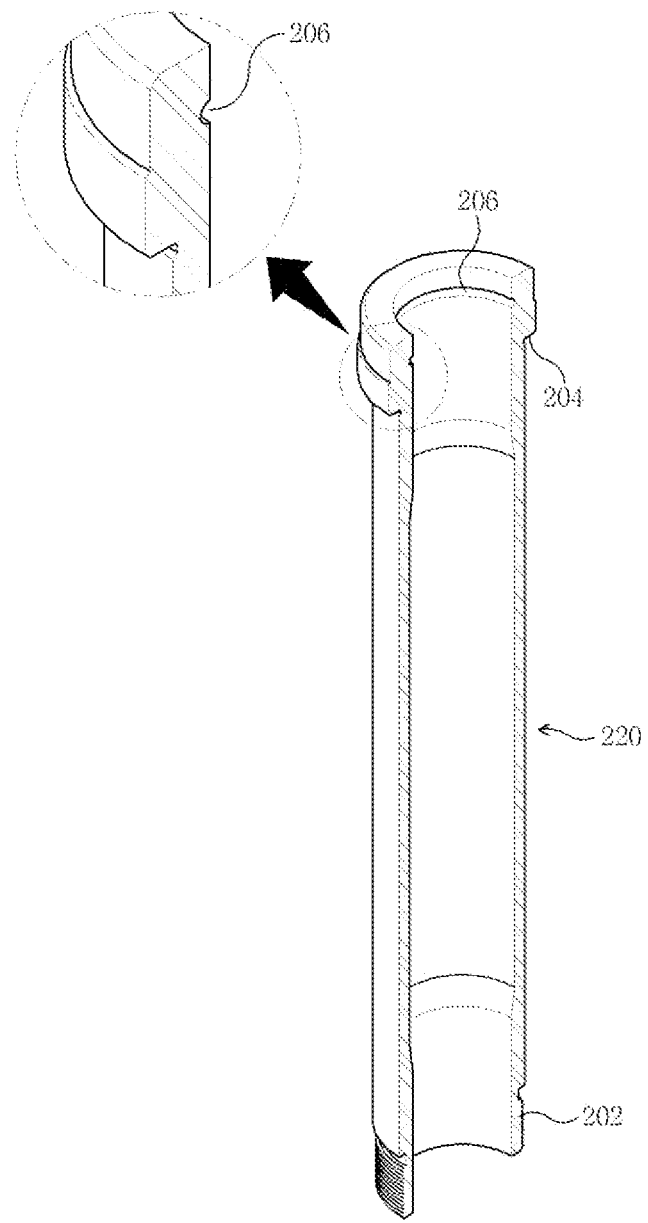
FIG. 13 is a perspective sectional view of an outer guide post according to a fourth embodiment of the present invention.

Referring to FIG. 13, an outer guide post 220 is shaped like a hollow cylinder that has upper and lower ends that are open. An external thread 202 is formed on a predetermined portion of an outer surface of a lower end of the outer guide post 220. The external thread 202 is used to join the outer guide post 220 with a flow plate 160 which will be explained later herein.

The diameter of a predetermined portion of an upper end of the outer guide post 220 is larger than at other portions of the outer guide post 220. Thus, an annular retaining part 204 is formed by this difference in diameter so that the outer guide post 220 can be joined with a hold-down plate (not shown) by means of the annular retaining part 204.

A coupling groove 206 is formed in an inner surface of the outer guide post 220. The coupling groove 206 is used to join the outer guide post 220 with an inner-extension tube which will be explained later herein.

The inner-extension tube includes an inner-extension tube body 230 and an inner-extension tube head 240.

Figure 14:
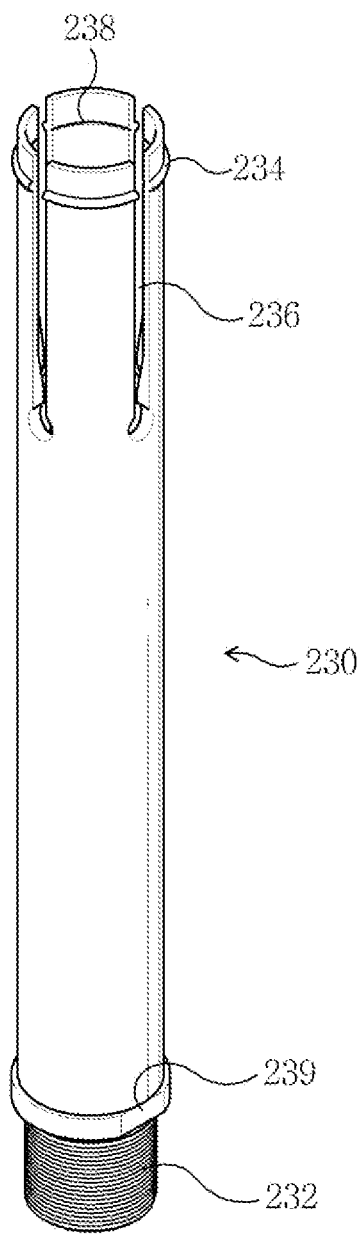
FIG. 14 is a perspective view of an inner-extension tube body according to the fourth embodiment of the present invention.

As shown in FIG. 14, the shape of the inner-extension tube body 230 is that of a hollow cylinder that has open upper and lower ends in the same manner as that of the outer guide post 220. Furthermore, the inner-extension tube body 230 is longer than the outer guide post 220 and is disposed in the outer guide post 220 in such a way that an upper end of the inner-extension tube body 230 is level with that of the outer guide post 220 while its lower end protrudes outwards from that of the outer guide post 220.

An external thread 232 is formed on a predetermined portion of the lower end of the inner-extension tube body 230, in other words, on the portion of the inner-extension tube body 230 that protrudes outwards from the outer guide post 2220. The external thread 232 is used to join the inner-extension tube body 230 with the guide thimble 3 which will be explained in detail later herein.

Furthermore, a circumferential coupling protrusion 234 is provided on the inner-extension tube body 230. The coupling protrusion 234 is disposed on a circumferential outer surface of the inner-extension tube body 230 at a position corresponding to the coupling groove 206 formed in the inner surface of the outer guide post 220 so that when the inner-extension tube body 230 is inserted into the outer guide post 220, they are coupled to each other by the coupling groove 206 and the coupling protrusion 234.

A plurality of longitudinal slits 236 of a predetermined length are formed in the upper end of the inner-extension tube body 230. The longitudinal slits 236 make it possible for the upper end of the inner-extension tube body 230 to move elastically so that when the inner-extension tube body 230 is inserted into the outer guide post 220, the coupling protrusion 234 can be easily hooked into the coupling groove 206.

Further, a coupling groove 238 is formed in an inner surface of the inner-extension tube body 230. The coupling groove 238 is used to join the inner-extension tube body 230 with an inner-extension tube head 240, and it will be explained later herein.

A rotation-preventing surface 239 is formed on the lower portion of the inner-extension tube body 230.

The rotation-preventing surface 239 is disposed above the external thread 232 that is formed on the lower end of the inner-extension tube body 230. The rotation-preventing surface 239 is a planar surface formed by cutting out a portion of an annular flange provided above the external thread 232. The rotation-preventing surface 239 functions to prevent the inner-extension tube body 230 from rotating when the inner-extension tube head 240 is separated from the inner-extension tube body 230.

Figure 15:
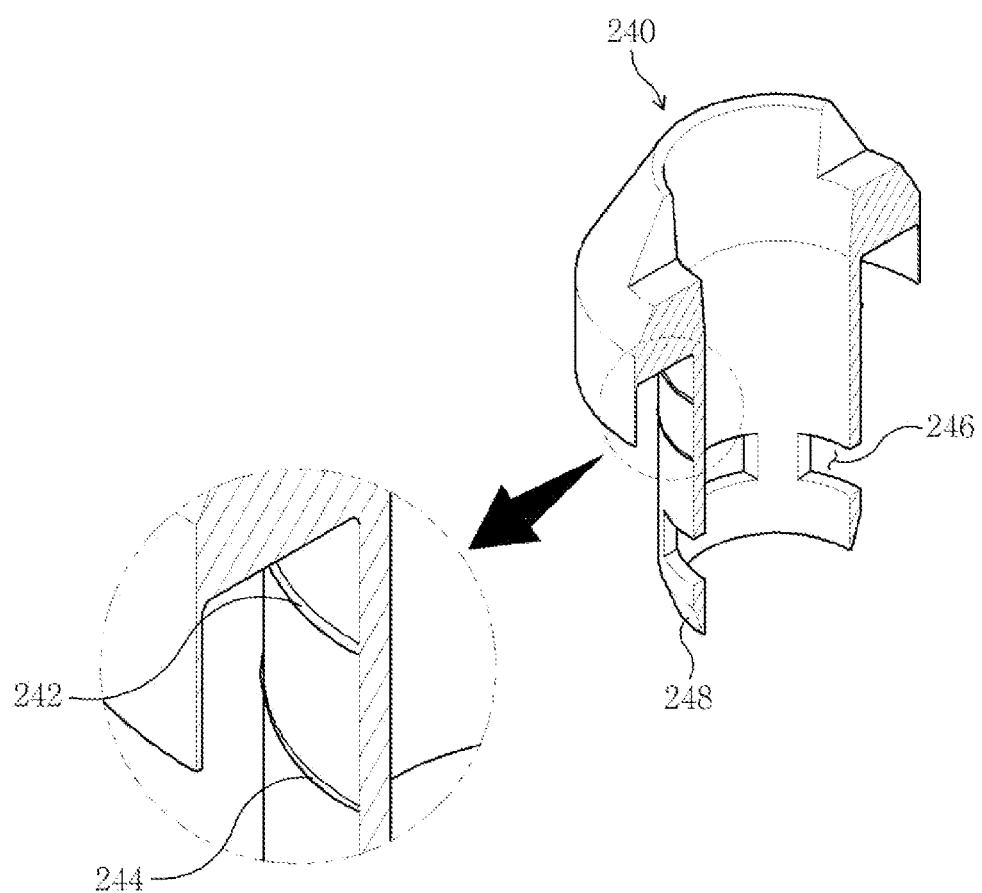
FIG. 15 is a perspective sectional view of an inner-extension tube head according to the fourth embodiment of the present invention.

As shown in FIG. 15, the inner-extension tube head 240 is coupled to the upper end of the inner-extension tube body 230 and has the shape of a cork stopper whose upper and lower ends are the same in shape but different in area. The inner-extension tube head 240 has a hollow structure which is open on upper and lower ends thereof.

A coupling protrusion 242 extends in a circumferential direction and is provided on a circumferential outer surface of a lower portion of the inner-extension tube head 240. The coupling protrusion 242 is disposed at a position that corresponds to the position of the coupling groove 238 of the inner-extension tube body 230 when the inner-extension tube head 240 is joined with the inner-extension tube body 230.

A fitting protrusion 244 which extends in a circumferential direction is provided on the circumferential outer surface of the lower portion of the inner-extension tube head 240. The fitting protrusion 244 functions to apply pressure to the inner surface of the inner-extension tube body 230 outwards when the inner-extension tube 250 is coupled to the outer guide post 220, thereby strengthening the coupling between them.

A plurality of through holes 246 are formed in the circumferential surface of the lower end of the inner-extension tube head 240. The through holes 246 allow a tool or the like to be inserted thereinto to facilitate removal of the inner-extension tube head when disassembling. A taper 248 is formed in the lower end of the inner-extension tube head

240, thus making it easy to insert the inner-extension tube head 240 into the inner-extension tube body 230 or remove it therefrom.

The joining between the top nozzle and the guide thimble using the force-fitting structure seldom causes the inner-extension tube body to be rotated. Therefore, this joint structure can be used regardless of the presence of the rotation-preventing surface As described above, in the present invention, a rotation-preventing surface is formed on an inner-extension tube, and a rotation-preventing portion is formed on a flow plate. Thus, when a top nozzle is separated from a guide thimble, the inner-extension tube is prevented from undesirably rotating, thereby preventing the inner-extension tube from becoming loosened from the guide thimble. Therefore, a separate rotation-preventing member is not required. Furthermore, because the area of the contact portion between elements that rotate can be minimized, the assembly or disassembly of the top nozzle can be facilitated, thus reducing the time required to assemble or disassemble the structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A combination of a guide thimble and a top nozzle for a nuclear fuel assembly, the combination comprising:
a guide thimble, and
a top nozzle coupled to the guide thimble, the top nozzle comprising:
   a flow plate located above the guide thimble, with a coupling through hole formed through the flow plate;
   an outer guide post coupled at a lower end thereof to the coupling through hole of the flow plate;
   an inner-extension tube disposed in the outer guide post in such a way that a lower end of the inner-extension tube passes through the coupling through hole of the flow plate; and
   an inner-extension tube head coupled to an upper end of the inner-extension tube and to an upper end of the outer guide post,
wherein:
the inner-extension tube includes a rim disposed within the coupling through hole of the flow plate;
the rim has a circumferential outer surface which includes a first region and a second region;
a circumferential inner surface of the coupling through hole of the flow plate includes a first part disposed at a position corresponding to the first region of the rim of the inner-extension tube and a second part; and
the first region and the first part, collectively, prevent the inner-extension tube from rotating when the inner-extension tube head is rotated.

2. The combination as set forth in claim 1, wherein the first region is formed as a planar surface; and the first part is formed as a planar surface.

* * * * *